APPARATUS FOR MANUFACTURING WOOD PARTICLE BOARDS
Filed Jan. 16, 1956 5 Sheets-Sheet 1
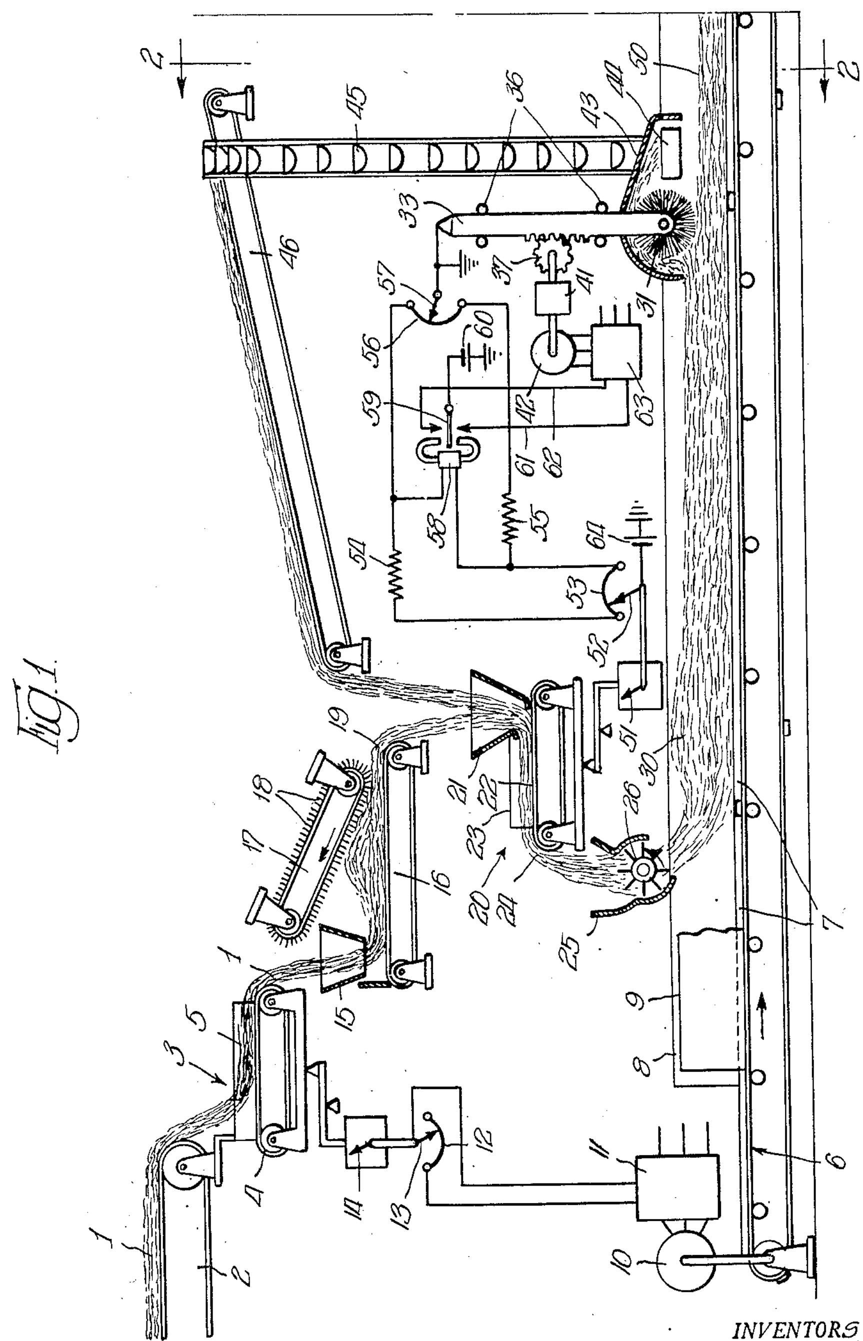
INVENTORS
Max Himmelheber,
Klaus Steiner,
BY George H. Simmons
Atty.

APPARATUS FOR MANUFACTURING WOOD PARTICLE BOARDS
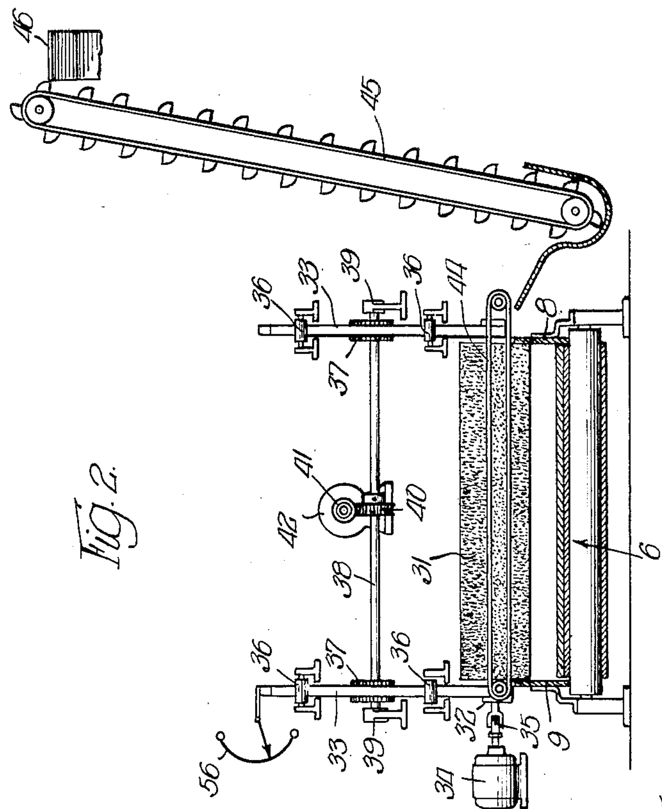
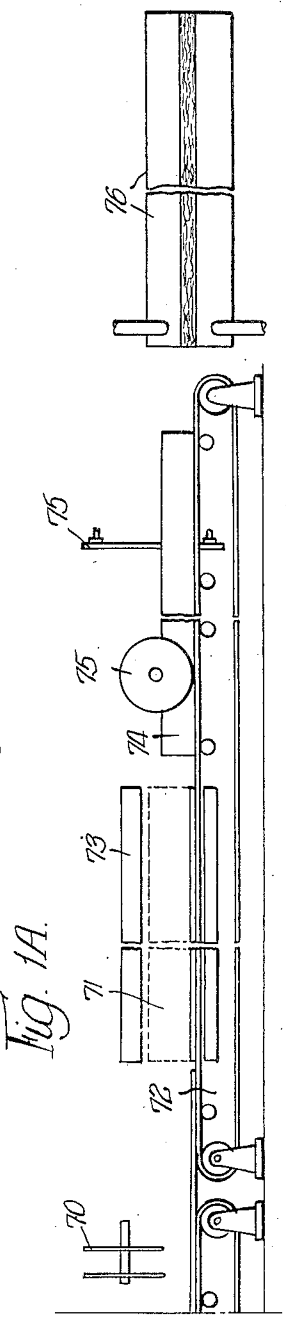
INVENTORS.
Max Himmelheber,
Klaus Steiner,
BY George H. Simmons
Atty.

Feb. 4, 1958 M. HIMMELHEBER ET AL 2,822,024
APPARATUS FOR MANUFACTURING WOOD PARTICLE BOARDS
Filed Jan. 16, 1956 5 Sheets-Sheet 3
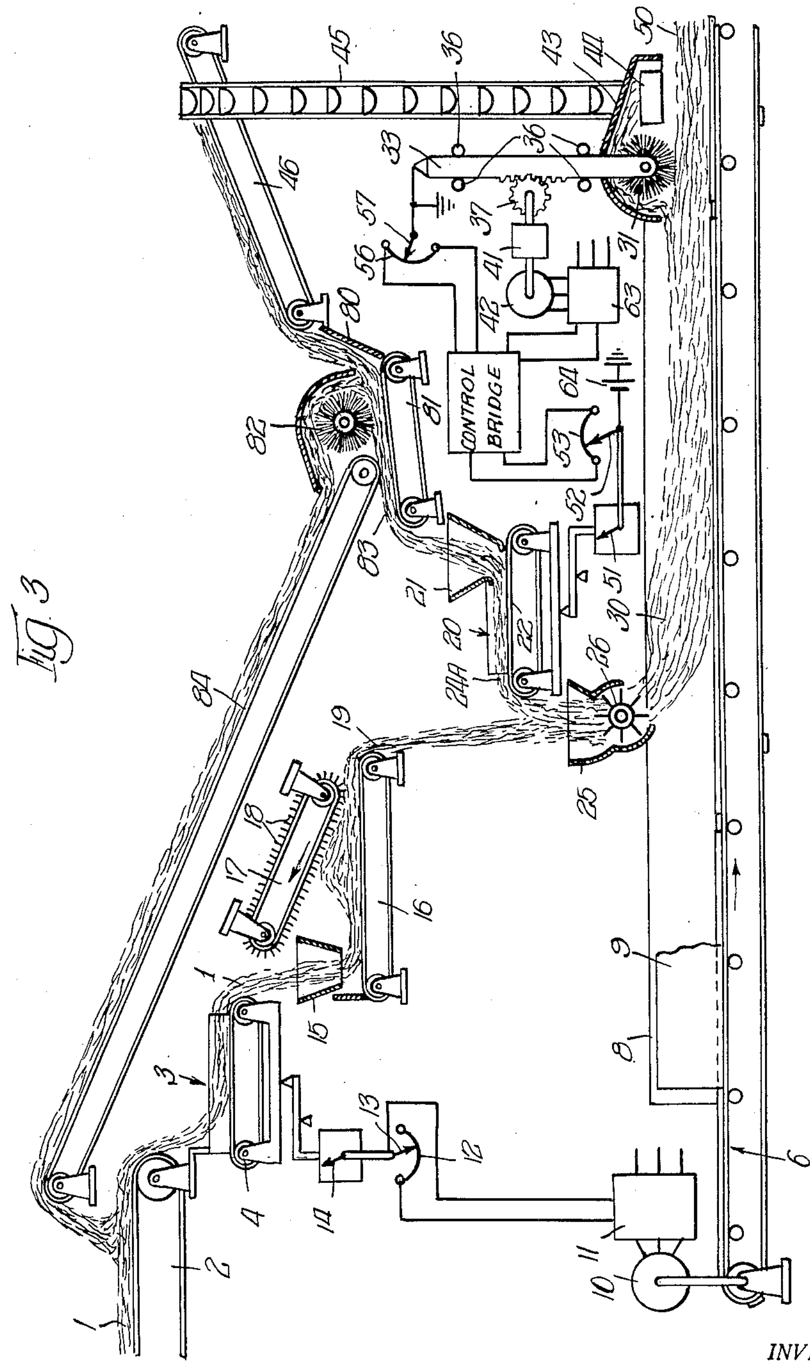
INVENTORS.
Max Himmelheber,
BY Klaus Steiner,
George H. Simmons
atty.

Feb. 4, 1958 M. HIMMELHEBER ET AL 2,822,024
APPARATUS FOR MANUFACTURING WOOD PARTICLE BOARDS
Filed Jan. 16, 1956 5 Sheets-Sheet 4
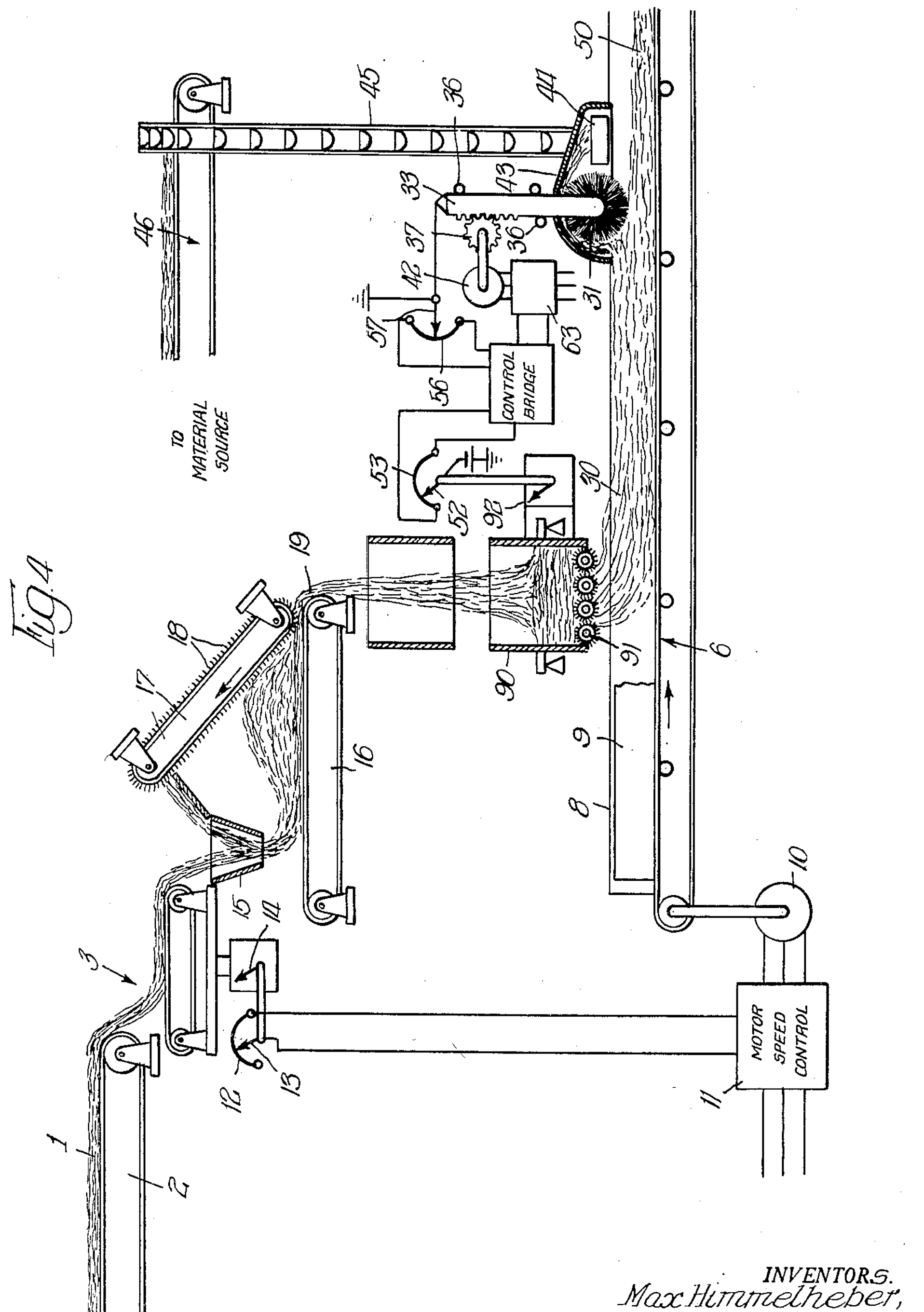
INVENTORS.
Max Himmelheber,
BY Klaus Steiner,
George H. Simmons
Atty.

Feb. 4, 1958 M. HIMMELHEBER ET AL 2,822,024
APPARATUS FOR MANUFACTURING WOOD PARTICLE BOARDS
Filed Jan. 16, 1956 5 Sheets-Sheet 5
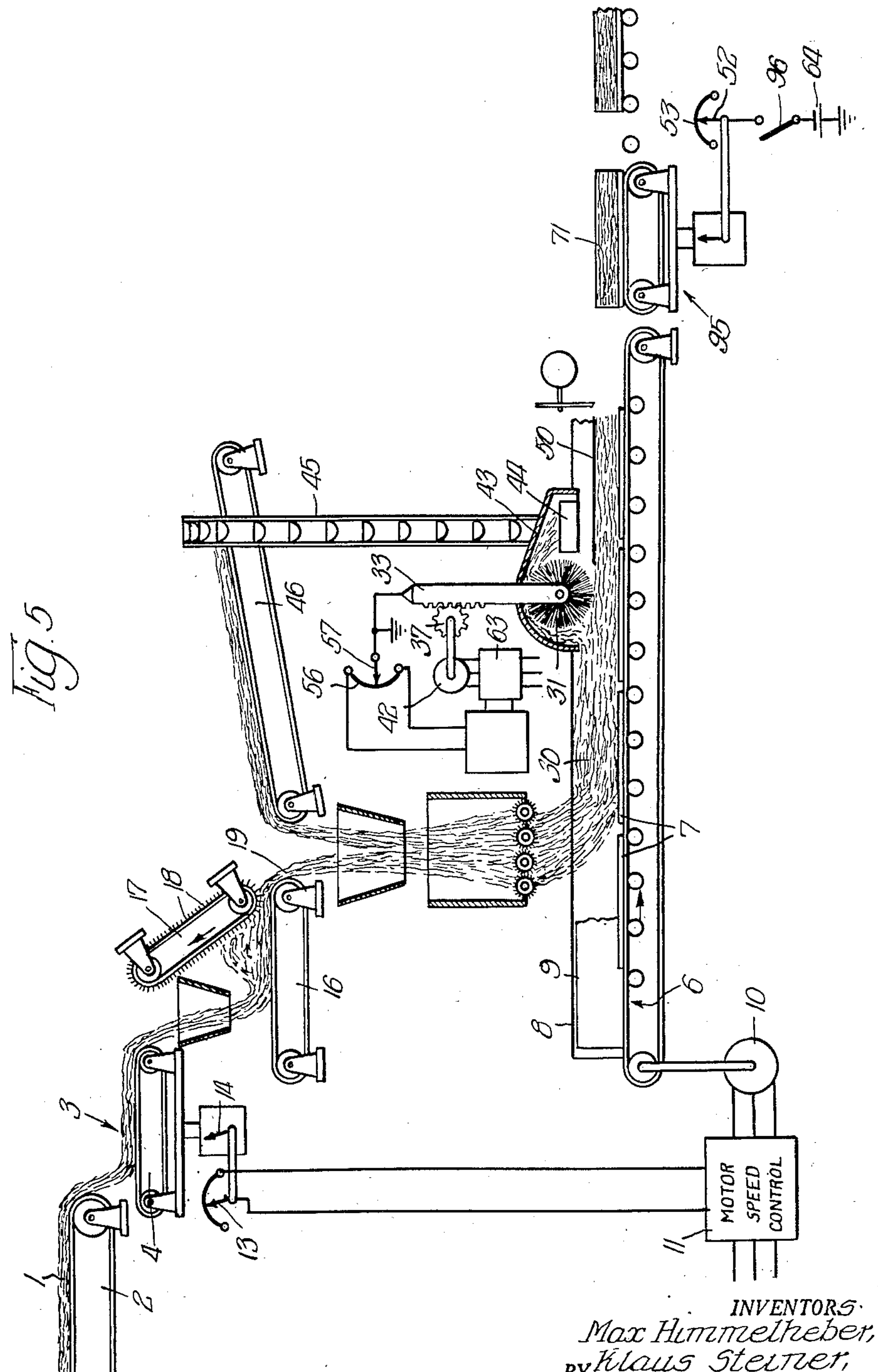
INVENTORS
Max Himmelheber,
Klaus Steiner,
BY George H. Simmons
Atty United States Patent Office 2,822,024

Patented Feb. 4, 1958

2,822,024

APPARATUS FOR MANUFACTURING WOOD PARTICLE BOARDS

Max Himmelheber, Baiersbronn, Black Forest, and Klaus Steiner, Bad Tolz, Germany, assignors to Allwood, Inc., Glarus, Switzerland, a corporation of Switzerland Application January 16, 1956, Serial No. 559,446

9 Claims. (Cl. 154—1)

This invention relates to apparatus for manufacturing wood particle boards and has for its principal object the provision of new and improved apparatus of this kind.

It is a main object of the invention to provide apparatus for forming a continuously moving continuous web of binder impregnated finely comminuted particles of fibrous stock such as wood, which web has uniform weight per unit of area within close tolerances, thereby insuring uniform weight of the finished board within the same tolerances.

Another object of the invention is to provide apparatus for forming a continuous moving web of material which is of uniform width, the thickness of which web is varied in inverse ratio to the weight of a unit volume of material in the web, thereby insuring that the web will have uniform weight per unit of area.

Another object of the invention is to provide apparatus for automatically varying the thickness of the continuous web of material in inverse ratio to the weight of a unit volume of the material in the web.

Further objects of the invention not specifically mentioned here will be apparent from the detailed description and claims which follow, reference being had to the accompanying drawings in which a preferred embodiment of the invention is shown by way of example and in which:

Fig. 1 diagrammatically illustrates a preferred form of the apparatus of the invention;

Fig. 1*a* is a diagrammatic representation of apparatus through which the web passes from the apparatus shown in Fig. 1;

Fig. 2 is an end view of the apparatus shown in Fig. 1, taken substantially along the line 2—2 of Fig. 1, looking in the direction of the arrows, drawn to an enlarged scale and with the cover of the stripper omitted;

Fig. 3 is a diagrammatic view similar to Fig. 1, showing a modified form of apparatus;

Fig. 4 is a view similar to Fig. 1, showing still another form of the apparatus; and Fig. 5 is a view similar to Fig. 1, showing still another form of the apparatus.

It is old in the prior art of which we are aware, to form a board from finely comminuted fibrous material such as wood, straw, reed, bamboo, and the like, which finely comminuted material has been impregnated with a binder or glue usually in the form of a thermosetting resin. When the finely comminuted particles are made from wood, discarded as waste in the lumber industries, the weight per unit volume of the material will vary directly with the specific gravity of the wood and also as the particle size and shape varies, thereby varying the amount of air entrained in a loosely matted mass of the material. When basic materials other than wood are used, the specific gravity is even more variable.

Apparatus for forming such particles into a continuous web, later to be cut into lengths, are likewise known in the prior art of which we are aware. In a system of continuous production of this kind, where the moving web is controlled solely by volumetric measurement of the material entering into it, the finished boards may vary in weight to an undesirable extent. In certain instances of the prior art of which we are aware, the boards are formed by so-called batch process in which the binder impregnated finely comminuted material is spread evenly in a form of size and shape depending upon the product to be made. In such a batch process, it is easy to control the weight of the finished product merely by accurately weighing the material placed in the form. In a continuous process, control of the weight is not as simple and it is the accurate control of the weight of a moving web that the apparatus of the present invention is designed to accomplish.

In accordance with the teachings of the present invention, the binder impregnated finely comminuted material is laid up in a continuous web on a moving conveyor. The material going into this web is supplied to the apparatus by suitable conveying means, and this incoming material is weighed continuously and the speed of the main conveyor adjusted to correspond to the weight of the incoming material. The material so delivered to the apparatus is formed into a constant volume of material preferably by forming a moving band of uniform width, length and thickness, and this band is weighed continuously. The material is delivered to a spreading device which lays up the material on the main conveyor in the form of a web of constant width and of thickness somewhat greater than is required. The excess material in the web is removed by a continuously operating stripping device and the material so removed returned to the system for re-use.

In accordance with the teachings of the present invention, the apparatus is arranged to vary the position of the stripping device with respect to the main conveyor in inverse ratio to the weight of the constant volume band of material moving in the apparatus. Also in accordance with the teachings of the present invention, this control of the position of the stripping device is effected automatically and continuously. Thus if the weight of the constant volume moving band of material increases, the stripper is lowered to remove more material from the web, thereby decreasing the thickness of the web, with the result that the finished web has uniform weight per unit of area within reasonably close tolerances. Conversely, if the weight of the constant volume band of material decreases due to a change in the specific gravity of the material or a change in the shape of the particles, with the result that more air is entrained in the constant volume band, the stripper is raised so as to remove less material from the web and to form the web with increased thickness, with the result that the finished web has uniform weight per unit of area.

The web thus formed and finished moves out of the apparatus of the present invention subsequently to be cut into lengths required for forming the end product boards of desired dimension, these lengths or blanks being preliminarily pressed to partially compact the material therein, then trimmed to size, and finally again compressed in a heated press to form the finished boards. Apparatus for performing these subsequent operations is known in the prior art of which we are aware.

Referring now to the drawings wherein identical parts bear the same reference numerals throughout the figures, and wherein supporting frameworks, driving motors, and the like, have been omitted to avoid an unnecessary complication of the drawings, the preferred embodiment of the invention will best be understood from Fig. 1 wherein previously binder impregnated finely comminuted fibrous material 1 is brought from suitable storage bins or silos, not shown, by a conveyor 2 which may conveniently be a belt conveyor. The material 1 is discharged into a scale device 3 which, in the embodiment shown, is a scale conveyor having a constantly moving belt 4 and guides 5 which retain the material on the belt. The volume of material passing over the scale device 3 per unit of time will ordinarily be substantially constant.

The main conveyor 6, upon which the web is to be formed, may consist of an endless belt or a chain conveyor upon which metal plates or cauls 7 are positioned and carried through the apparatus in the direction indicated by the arrow. Located alongside of the conveyor 6 are guides 8 and 9, the front guide 9 in Fig. 1 being shown as slightly smaller than the rear guide 8 for the sake of clarity. Guide 9 is broken away in Fig. 1, the better to show the web that is disposed behind it.

The main conveyor 6 is driven by a suitable source of power such as a motor 10, the speed of which is controlled by a controller 11 of known design. The scale device 3 is connected to a rheostat 12, the movable arm 13 of which moves in synchronism with the weight indicator 14 of the scale device. Through this arrangement, the forward speed of the main conveyor 6 is controlled in direct proportion to the weight of the material 1 coming into the apparatus.

The material 1 discharged from the scale device 3 in this embodiment of the invention is delivered through a suitable funnel or guide 15 onto an auxiliary feed conveyor 16 which, in the example shown, is an endless belt conveyor equipped with side guides, not shown, to retain the material on the upper reach of the belt. Fixed above the upper reach of conveyor 16 is an endless belt stripper 17 which may consist of a belt from which spikes 18 project. This auxiliary stripper 17 moving in the direction of the arrow levels off the material on the auxiliary feed conveyor 16 so that the material 19 is discharged from the conveyor 16 at a uniform rate. Excess material removed by the auxiliary stripper is returned to the system and in the embodiment shown by way of example this material is delivered to the funnel 15.

Located above the main conveyor 6 and below the auxiliary feed conveyor 16 is a second scale device indicated generally at 20, which device consists of a hopper 21 into which the material 19 moving off of the auxiliary feed conveyor 16 is discharged. The scale device 20, in the embodiment shown, is a scale conveyor open upper reach 22 of which a constant volume band of material is formed, the device being equipped with side guides 23 to retain the material on the conveyor. The constant volume band of material 24 so formed is weighed by the scale device 20 and that weight utilized as will presently appear.

The scale device 20 discharges the material 24 into a hopper 25 of a spreading device 26. The particular type of spreading device forms no part of the present invention, as there are a number of such devices which can be used within the teachings of the present invention. Devices suitable for such use are shown in the co-pending application of Himmelheber, Kull and Steiner, Serial No. 395,526, filed December 1, 1953, now Patent No. 2,737,997, issued March 13, 1956. It is sufficient to note here that the spreading device 26 includes a vanelike member rotating in the direction of the arrow, upon which member the material 24 falls. This rotating member serves to break up any lumps that may be in the material and to deposit the material evenly in the main web 30 on the main conveyor 6 between the side plates 8 and 9 thereof. It will be noted that the web 30 has thickness in excess of that required for the final web.

This excess material is removed from the web 30 by a stripper mechanism 31 which may consist of a stiff bristle brush or a spiked drum that is journaled in journals 32, Fig. 2, carried in rack bars 33. The stripper 31 is driven by a suitable source of power such as a motor 34 connected to the shaft of the drum through a universal joint 35.

Rack bars 33 are maintained in vertical position by suitable guide rollers 36, and spur gears 37 carried upon a shaft 38 that is journalled in fixed supports 39 are meshed with the teeth of the rack bars. Shaft 38 carries a worm gear 40 with which a worm 41 is meshed, that worm being driven by a reversible motor 42.

Excess material removed from the web 30 by the stripper 31 passes through the housing 43 that encloses the stripper 31 and is deposited upon a cross conveyor 44 which, in the example shown, consists of a belt conveyor from which the material is discharged into an elevating conveyor 45 which in turn deposits the material upon a conveyor 46 that returns the material to the system, and in the example shown in Fig. 1 this material is returned to the hopper 31 of the scale device 20.

From the foregoing it will be apparent that the constant volume band of material 24 on the scale device 20 consists of a mixture of material 19 incoming to the apparatus and the excess material returned thereto.

In order to control the finish thickness 50 of the web 30 so as to insure that the web will have uniform weight per unit of area, notwithstanding variations in the weight of unit volume of the material from which the web is formed, the indicating arm 51 of scale device 20 is connected to the movable arm 52 of a potentiometer 53, the terminals of the potentiometer 53 being connected through resistances 54 and 55 to the terminals of a potentiometer 56, the movable arm 57 of which is controlled by the rack 33 by which the stripper 31 is supported. Connected across the bridge circuit thus formed is a polarized relay 58, the movable arm 59 of which is connected to a source of power 60. The normally open contacts of this relay 58 are connected by conductors 61 and 62 to a controller 63 by which the motor 42 is controlled.

Power is supplied to the potentiometer arm 52 from a source 64 that is connected to ground, and potentiometer arm 57 is grounded. The bridge now being assumed to be in balance, polarized relay 58 will be de-energized and its movable contact 59 disposed midway between the normally open contacts. Assuming that the weight of the constant volume band of material 24 on the scale device 20 increases, potentiometer arm 52 will be moved and the bridge will be thrown out of balance, with the result that polarized relay 58 will operate to move its movable contact 59 into engagement with conductor 61. Controller 63 is thus operated to cause motor 42 to operate in such a direction as to lower the stripper 31 thereby to reduce the thickness of the web 30. This movement of the stripper causes a corresponding movement of the potentiometer arm 57 and the bridge is re-balanced thereby, at which time relay 58 restores to normal and the motor 42 stops. The finish thickness 50 of the web is thus reduced, with the result that the weight of the web per unit area is maintained notwithstanding the assumed increase in the weight of the constant volume band 24 of material. Conversely, if the weight of the constant band 24 of material decreases, the bridge will be unbalanced in the opposite direction and polarized relay 58 will operate to connect its movable contact 59 to the conductor 62, thereby actuating the controller 63 to cause the motor 42 to operate in the opposite direction thereby to raise the stripper 31. This movement continues until the bridge is again balanced and the finish thickness 50 of the web thereby increased to compensate for the decrease in the weight of the constant volume band 24 of the material.

The main conveyor 6 carries the web so formed beyond the apparatus of the present invention where a moving saw 70 cuts from this web a blank 71 of length proper for the size of board to be formed. This blank 71 is carried by a conveyor 72 that moves at a higher speed than the main conveyor 6 to a pressing device 73 which compresses the blank. The thus compressed blank 74 is trimmed by saws 75 and carried into a hot press 76 which compresses the blank to final thickness and applies heat to set the binder thereby to finish the board. The apparatus shown in Fig. 1*a* forms no essential part of the present invention and is known in the art through the co-pending application of Himmelheber, Steiner and Kull, Serial No. 384,168, filed October 5, 1953.

From the foregoing it will be apparent that the apparatus of the present invention controls the finish thickness of a moving web of material in inverse ratio to the weight of a constant volume band of material, which band is formed by intermixing fresh material coming into the apparatus with the excess material returned thereto.

In the embodiment of the invention shown in Fig. 3, the constant volume band of material **24*a* moving through the scale device 20 is formed solely of excess material returning to the system. In this embodiment of the invention, conveyor 46 discharges into the hopper 80 of an auxiliary conveyor 81, and an auxiliary stripper 82 levels the material into a substantially constant band 83, the band 83 being discharged into the hopper 21 of the scale device 20. Excess material removed by the stripper 82 is deposited upon an endless belt conveyor 84 and returned to the feed supply on the conveyor 2** moving into the system.

The incoming material 1 is formed into a constant volume stream of material 19 that is discharged directly into the hopper 25 of the spreader device 26. The band of material **24*a* moving off of the scale device is also discharged into the hopper 25 where it is intermingled with the fresh supply band 19 and laid up by the spreader device 26 into the web 30 on the main conveyor 6. The speed of the main conveyor is regulated through scale device 3 and controller 10 as before, and the position of the stripper 31 is adjusted by the bridge control circuit through controller 63** in the above described manner.

In instances where the weight per unit volume of the material is subject to abrupt changes, the embodiment of the invention shown in Fig. 1 may be advantageous. In instances where the changes in the weight per unit volume of the material is more gradual, the arrangement shown in Fig. 3 may be advantageous. The web formed to finish thickness in inverse ratio to the weight of a constant volume of material by the apparatus shown in Fig. 3 passes into the apparatus shown in Fig. 1*a* as before.

In Fig. 4 we have shown still another embodiment of the invention in which the incoming material 1 passes over a scale device 3 as before, onto an auxiliary conveyor 16, there to be formed into a constant volume per unit time web of material 19 that is discharged directly into the hopper 90 of a spreader device 91 of the type shown in Patent 2,676,694, issued April 27, 1954, to Wyss, et al. Spreader device 91 spreads this material onto the main conveyor, forming a web 30 thereon as before. Stripper 31 removes excess material and through conveyors 44 and 45 delivers it to a conveyor 46 that returns the material to the source from which incoming material 1 is obtained. Through this arrangement the material 19 flows into the hopper 90 at a uniform rate; and since the spreader device 91 removes the material from the hopper at a uniform rate, the volume of material in the hopper will be constant within narrow limits. In this embodiment of the invention the material in the hopper 90 is weighed by a scale device 92 which controls the position of potentiometer arm 52 of the potentiometer 53, and the potentiometer 53 is connected to the control bridge and potentiometer 56 as before. The movable arm 57 of potentiometer 56 is connected to the rack 33 as before. The bridge functions to operate controller 63 as before, to adjust the finish thickness 50 of the web 30 in inverse proportion to the weight of the constant volume of material in the hopper 90.

In Fig. 5 we have shown still another modification of the invention in which the position of the stripper 31 is controlled by the weight of the blank 71 that has been severed from the web. In this embodiment of the invention, the scale device 95 controls the movable arm 52 of potentiometer 53 as before, and when the blank 71 is centered upon the scale device 95, contact 96 is closed to connect the source of power 64 to the bridge circuit, thereby to re-position the stripper 31 in the hereinbefore described manner. It will be noted that in the embodiment of the invention shown in Fig. 5, the material is not weighed to control the stripper until the blank 71 has been severed from the web. An arrangement of this kind is advantageous when the weight and size characteristics of the incoming stock 1 is very uniform.

From the foregoing it will be apparent that we have provided apparatus for automatically adjusting the thickness of a constantly moving web of material so that that web will have constant weight per unit of area. The apparatus functions automatically and continuously, so that the desired uniform weight per unit of area is maintained notwithstanding that there may be variations in the weight and characteristics of the incoming material.

While we have chosen to illustrate our invention by showing and describing a preferred embodiment of it, we have done so by way of example only, as there are many modifications and adaptations which can be made by one skilled in the art within the teachings of the invention.

Having thus complied with the statutes and shown and described a preferred embodiment of our invention, what we consider new and desire to have protected by Letters Patent is pointed out in the appended claims.

What we claim is:

1. Apparatus for forming on a moving conveyor a continuous web of binder impregnated finely comminuted fibrous stock, which web is of uniform width and has uniform weight per unit of area, which comprises: feed conveyor means for introducing the stock into the apparatus, a scale device; means for forming and maintaining a constant volume of material in said scale device into which the material from said feed conveyor is delivered; a spreading device into which the material in said scale device is delivered, said spreading device forming a web of the material on said moving conveyor, which web has constant width and excess thickness; a stripper disposed above said moving conveyor and web for removing excess material from the web; means actuated by said scale device for adjusting the distance between said moving conveyor and stripper in inverse ratio to the weight of said constant volume of material; and conveyor means for returning the excess material removed by the stripper to the apparatus.

2. Apparatus as specified in claim 1, in which the means for forming the constant volume of material includes a hopper to which the material is delivered, which hopper is disposed a fixed distance above the scale device.

3. Apparatus as specified in claim 1, in which the stripper is supported upon a rack means with which motor driven spur gear means are meshed and the motor is controlled through a Wheatstone bridge that is unbalanced by a change in the weight of material on the second scale conveyor and rebalanced by corresponding movement of the rack means.

4. Apparatus as specified in claim 1, in which the means for forming a constant volume of material on the second scale device comprises a hopper in which material entering the apparatus and excess material removed from the web by the stripper are intermingled.

5. Apparatus as specified in claim 1, in which the conveyor means for returning excess material discharges onto an auxiliary conveyor, an auxiliary stripper over the conveyor levels the material into a constant volume band, and in which the auxiliary conveyor discharges the material onto the second scale device.

6. The combination with a main conveyor, a motor for driving said conveyor, a device for spreading binder impregnated finely comminuted fibrous material on said conveyor to form thereon a web of constant width, a stripper for adjusting the thickness of said web and a feed conveyor for bringing the material into the apparatus; of mounting means for said stripper including racks and pinions; a reversible motor for driving said pinions; a controller for said reversible motor; a scale device; means for maintaining a constant volume of material moving through said scale device; means actuated by said scale device for operating said reversible motor controller to cause the reversible motor to operate to move the stripper towards the main conveyor when the weight of the constant volume of material on said scale device increases and to move the stripper away from said main conveyor when that weight decreases; and conveyor means for returning the material removed from the web to the apparatus.

7. Apparatus as specified in claim 6, in which the means actuated by the scale device comprises a Wheatstone bridge circuit unbalanced by a change in the weight of the material on the scale device and rebalanced by a corresponding change in the position of the stripper, and a controller for the reversible motor which operates the motor responsive to an unbalance in said bridge.

8. Apparatus as specified in claim 6, in which the material entering the apparatus falls onto an auxiliary feed conveyor, in which an auxiliary stripper forms the material into a constant volume band that is discharged into the device for spreading the material in the web on the main conveyor and in which the scale device weighs the material in said spreading device.

9. In an apparatus for laying up a horizontally moving web of finely comminuted binder impregnated material, which web has uniform width and excess thickness, which apparatus includes scale means for weighing a constant volume of the material going into the web and a vertically movable stripper for removing excess material from said web; means for controlling the vertical position of the stripper comprising: rack bars on which the stripper is journaled; pinion gears engaging said racks; a reversible motor for driving said pinions; a control unit for said motor; a polarized relay for actuating said control unit; a constantly energized Wheatstone bridge circuit across which said relay is connected; a potentiometer in said bridge circuit the movable arm of which is operated by said scale means to unbalance the bridge responsive to an increase in weight of the material on said scale means, thereby to operate said relay in a direction to actuate the motor control to cause the motor to lower the stripper; a second potentiometer in said bridge circuit the movable arm of which is operated by said rack bars to rebalance the bridge when said stripper has been lowered sufficiently to insure that the web will have uniform weight per unit area.

References Cited in the file of this patent

UNITED STATES PATENTS

| | | |
|---|---|---|
| 1,777,670 | Hausman | Oct. 7, 1930 |
| 2,261,655 | Lowe | Nov. 4, 1941 |
| 2,540,146 | Stober | Feb. 6, 1951 |
| 2,579,770 | Uschmann | Dec. 25, 1951 |
| 2,635,301 | Schubert et al. | Apr. 21, 1953 |
| 2,662,665 | Harper | Dec. 15, 1953 |
| 2,676,694 | Wyss et al. | Apr. 27, 1954 |
| 2,688,393 | Uschmann | Sept. 7, 1954 |
| 2,693,619 | Goss | Nov. 9, 1954 |
| 2,700,177 | Mottet | Jan. 25, 1955 |
| 2,726,922 | Merrill et al. | Dec. 13, 1955 |
| 2,737,997 | Himmelheber et al. | Mar. 13, 1956 |
| 2,743,758 | Uschmann | May 1, 1956 |
| 2,744,045 | Collins | May 1, 1956 |